United States Patent Office 3,544,938
Patented Dec. 1, 1970

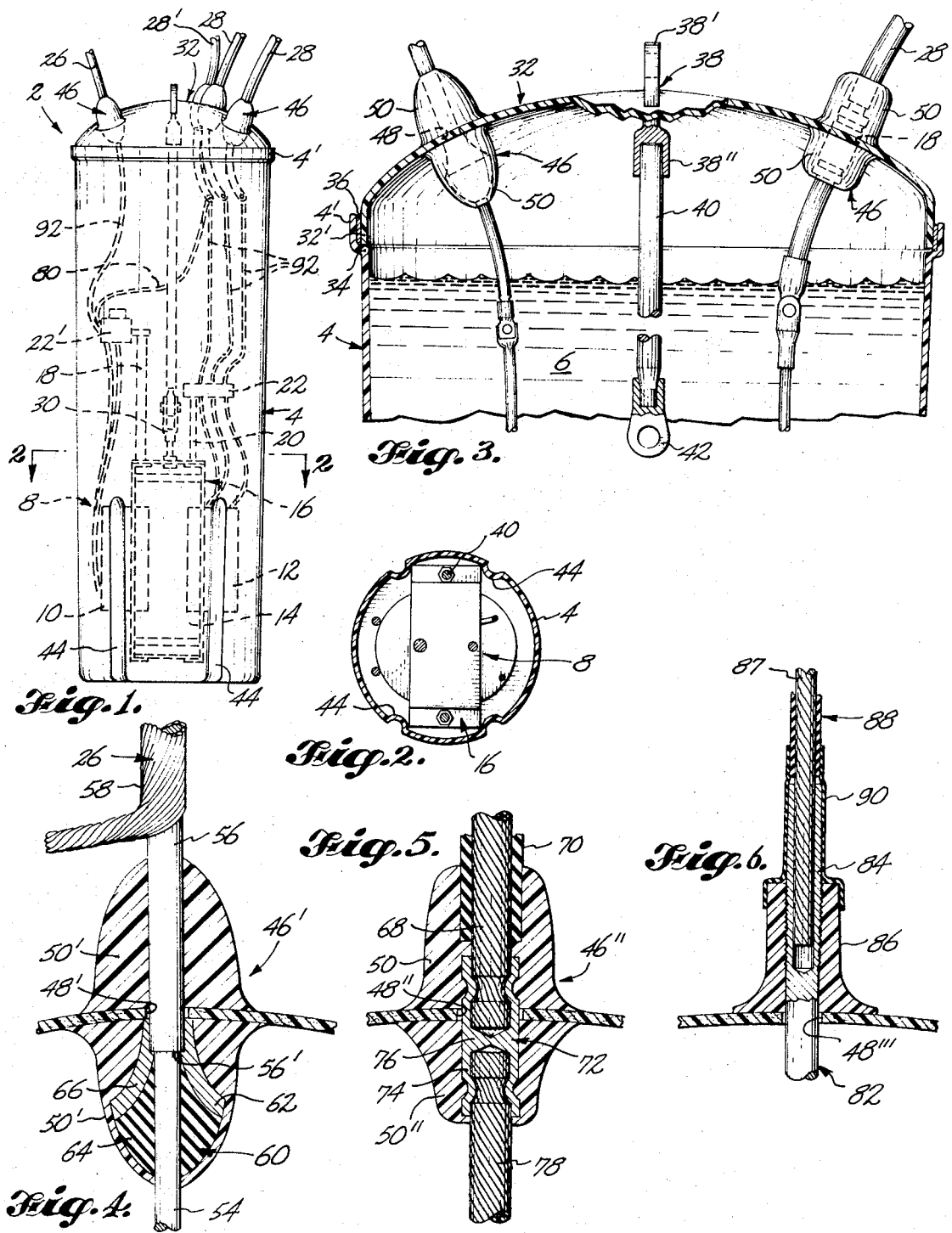

3,544,938
SEALED POWER TRANSFORMER
Elmer G. Bergmann, Vancouver, and Vern D. Ritter, Shelton, Wash., assignors to Tyee Construction Company, Kirkland, Wash., a corporation of Washington
Filed June 12, 1969, Ser. No. 832,627
Int. Cl. H01j 27/06
U.S. Cl. 336—92
18 Claims

ABSTRACT OF THE DISCLOSURE

In the manufacture of a hermetically sealed power transformer, a reinforced resinous plate cover is molded or otherwise formed around a mechanical attachment device so that the cover and device are hermetically sealed to one another and the device provides an attachment point on each side of the cover. In addition, holes are formed in the cover for a length of primary cable and a pair of moisture proof secondary cable connectors; and resinous sealing grommets are molded around the holes while the length of cable and connectors are inserted therein, so as to hermetically seal the holes and secure the cable and connectors in the cover, while maintaining exposed electrical contact points for the same on one side of the cover. Then, a transformer core and coil unit is freely suspended from the attachment device on the other side of the cover, for electrical interconnection with the contact points through the cable and connectors, and immersion in a tank of dielectric fluid therebelow.

FIELD OF THE INVENTION

This invention relates to sealed power transformers, and in particular to power distribution transformers of the fluid immersion type which are hermetically sealed for direct burial underground, as for example, in conjunction with the individual residences of a new residential subdivision or redevelopment area.

BACKGROUND OF THE INVENTION INCLUDING CERTAIN OBJECTS THEREOF

The electrical industry has sought a direct burial transformer which is free from water leakage problems, and from the problems of casing damage due to corrosion and electrolytic action in moist soil. It has also sought a direct burial transformer which is cheap enough to be installed with each individual residence in a new residential subdivision or redevelopment area, as opposed to several residences sharing a single transformer.

One object of the present invention is to provide a cheap, inexpensively assembled and installed transformer of the fluid immersion type which is free from water leakage problems, and from the problems of chemical and electro-chemical corrosiveness in moist soil; and also capable of being electrically interconnected with the power distribution system, or the primary and secondary cables thereof, before the transformer core and coil unit is immersed in the dielectric bath. Another object is to provide a cheap, inexpensive transformer of this nature which is housed in a two-piece casing, one piece of which contains the dielectric immersion bath, and the other of which is a cover that also serves as a gantry by which the transformer core and coil unit can be freely suspended in the bath, and readily installed and removed by crane to and from a point separate from the bath. A further object is to provide a transformer of this nature which is sufficiently cheap to be virtually a "throw-away" item so that it can be installed with each individual residence in a residential subdivision or redevelopment area, and can be assembled, installed, tested, or otherwise handled apart from the immersion bath. Other objects include the provision of a transformer of this nature which can be preassembled, installed and sealed under vacuum in the casing, without the necessity for reaching down into the bath, or for handling the coil and core unit in the bath, as for example, to fasten or remove mounting bolts; and which is free from external electrical connections that present a safety problem, or a replacement or reentry problem, while the unit is in service. Still further objects will become apparent from the description of the invention which follows hereafter.

SUMMARY OF THE INVENTION

According to the invention, the transformer is manufactured in two parts, one of which is a tank for containing the immersion bath, and the other of which is a lid which serves both as a gantry for freely suspending the transformer core and coil unit in the bath, and as a prewired cover for hermetically sealing the unit in the tank. The lid is made by forming a reinforced resinous plate cover around a mechanical attachment device so that the cover and device are hermetically sealed to one another and the device provides an attachment point on each side of the cover. In addition, holes are formed in the cover for a length of primary cable and a pair of moisture proof secondary cable connectors; and resinous sealing grommets are molded around the holes while the length of cable and connectors are inserted therein, so as to hermetically seal the holes and secure the cable and connectors in the cover, while maintaining exposed electrical contact points for the same on one side of the cover. Then, a transformer core and coil unit is freely suspended from the attachment device on the other side of the cover, electrically interconnected with the contact points through the cable and connectors, and immersed in the tank of dielectric fluid to a level sufficient to cover the interconnections. Also, while the tank is under vacuum, the cover is rested on top of the tank and hermetically sealed to the same so as to close the tank, as by bonding the cover to the tank with an adhesive that is compatible with the resin of the cover.

The cover and sealing grommets may be formed in a single molding operation or in separate operations. In the manufacturing operation, one end of the primary cable conductor is passed entirely through the cover so that it will project into the tank from the aforesaid other side or inside of the cover. The primary cable conductor has a semiconductive sheath thereon surrounded by a plurality of exposed neutral conductor strands, and the strands are stripped back onto the cable on the outside of the cover, and the semiconductive sheath is embedded within the sealing grommet for the primary cable, and terminated therewithin at a stress relief cone also embedded in the grommet around the cable. The secondary cable connectors are tubular and have solid, electrically conductive moisture barriers formed therein. The secondary contact points may be formed by exposing contact surfaces of the connectors, or by interconnecting lengths of secondary cable with the connectors and molding the connections into the cover with the same.

To assist in installing the transformer core and coil unit, the tank has vertically disposed guides angularly spaced about the interior therof, and the core and coil unit is slidably interengaged with the guides to securely position it in the tank. Preferably, the tank has an upright elongated tubular configuration; and the unit is freely suspended in the lowermost portion of the tank, and the dielectric fluid is filled to a level in the uppermost portion of the tank to provide a high column of fluid within which reentrant convection currents are set up for cooling purposes.

BRIEF DESCRIPTION OF THE DRAWINGS

These features will be better understood by reference to the accompanying drawing wherein:

FIG. 1 is a part schematic elevational view of a sealed two-part distribution transformer for direct burial in the ground;

FIG. 2 is a cross-sectional view of the transformer in the horizontal plane 2—2 of FIG. 1;

FIG. 3 is a part vertical cross-sectional view of the transformer, showing the upper end of the immersion tank and the prewired gantry cover for suspending the transformer core and coil unit in the tank;

FIG. 4 is a cross-sectional view of the sealed through-cover entry for the high voltage primary cable;

FIG. 5 is a cross-sectional view of each sealed in-cover juncture made between the secondary winding and the low voltage secondary cables; and FIG. 6 is a cross-sectional view of an alternative form of in-cover juncture for the secondary winding and the secondary cables.

DESCRIPTION OF THE PREFERRED EMBODIMENT

Referring to the drawing, it will be seen that the transformer 2 includes a tall, tapered-cylindrical tank 4 containing a dialectric liquid 6 such as oil, and a transformer core and coil unit 8 located within the tank below the level of the liquid. The core and coil unit 8 includes a primary or high voltage winding 10, and a secondary or low voltage winding 12, inductively disposed on a magnetic core 14 in conventional manner. The core 14 is carried in a saddle frame 16 which has a bracket 18 and a pair of pipe standards 20 mounted upright on opposite sides thereof, carrying insulative yokes 22. Insulated electrical conductors 24 lead from the windings to terminals in the yokes, for interconnection with the primary and secondary cables 26 and 28, as shall be explained. In addition, the top of the frame 16 is equipped with a pair of clevis connections 30 at the ends thereof.

The core and coil unit 8 is freely suspended in the liquid 6 in the tank by means of a gantry cover 32 resting on top of and sealed to the tank 4. The rim 4' of the tank is outwardly flared to form a shoulder 30 (FIG. 3) around the inner periphery thereof, and the cover 32 is dome-shaped with the exception of a shallow cylindrical wall or skirt 32' formed around the outer periphery thereof. The skirt 32' is sized to fit within the flared rim 4' of the tank, and to rest on the shoulder 34 formed therearound. An adhesive bonding material 36 is grouted between the skirt and rim to hermetically seal the cover to the tank.

Both the cover 32 and the tank 4 are fabricated from a dense fiberglass-reinforced resinous material such as one of the polyester resins which are highly resistant to underground soil and moisture conditions. Each is cast or molded as a separate piece, and at the time of the molding operation each has a number of structural features which are molded into or onto it, to accommodate the core and coil unit 8. In the case of the cover 32, these include a pair of oppositely eccentrically disposed, threaded female eyebolts 38 which are cast upright within the shell of the cover so that the eyes 38' of the same are exposed to the upper or outside of the cover, but coated with resin. The eyes serve as means for engaging and lifting the cover, whereas the directly connected threaded receptacles 38" of the bolts depend within the recess of the cover and serve as attachment points for the core and coil unit. The unit is suspended from the bolts 38 by a pair of dielectric hanger rods 40 which are threaded at each end and equipped with female eyebolts 42 at the lower ends thereof for interconnection with the clevises 30 on the frame 16. When the unit 8 is lowered into the tank, it is guided into position near the bottom thereof, by a set of inwardly projecting vertical ribs or flutes 44 which are molded into the wall of the tank at symmetrical locations therearound.

The respective eyes 38' and 42 and hangar rods 40 may be single integral members of polyester-impregnated fiberglass, nonmagnetic metal, or some other dielectric material.

The cover 32 also has a set of bushed cable entry and/or juncture grommets 46 molded thereon around holes 48 in the cover. The grommets 46 are built up from a pair of oppositely disposed, epoxy resin bushings 50 which are molded to the cover while the respective cables 26 and 28 are retained in the holes 48 by jigs. Each of the grommets 46 is specially adapted to accommodate the cable entering at this point, and to assure that the entry is entirely hermetically sealed and electrically protected. Referring first to the grommet and connection 46' in FIG. 4, it will be seen that the primary cable 26 has a solid central conductor of copper, aluminum, sodium or other electrically conductive material, surrounded by successive layers of polyethylene insulation 54, semiconductive material 56, and exposed neutral conductor strands 58. At the time the grommet 46' is molded, the strands 58 at the end of the cable are stripped back to expose a foot or more of the semiconductive material 56, and in addition, several inches of the exposed semiconductive material are cut away to expose the insulation 54 at the end of the cable. Then the cable is mounted in a jig and positioned in the cover 32 so that the semiconductive layer 56 extends to a point just inside of the hole 48' therein. Next, a counterbored and flared frustoconical stress relief cone 60 having mating semiconductive and high-dielectric insulative elastomeric bodies 62 and 64 therein, is slipped over the end of the cable and abutted against the inside edge of the hole 48', so as to provide a flared conical relief joint 66 at the terminal end 56' of the layer 56. The bushings 50' are then molded around the assembly in direct faying contact with all surfaces thereof, so as to fully encase or embed the assembly in resin.

The secondary cable 28 has a stranded-metal conductive core 68 surrounded by a layer of polyethylene insulation 70. In order to guard against the entry of moisture into the tank through the stranded core of the cable, the cable conductor 68 is terminated in the cover 32 at a conductive moisture barrier 72 embedded therein. At the time each of the grommets 46" in FIG. 5 is molded, one end of a tubular, ductile metal compression connector 74 with a solid conductive, transversely disposed web 76 therein, is crimped onto the terminal end of the cable conductor 68, and then onto a corresponding cable conductor 78 at the other end. The compression connector 74 is then positioned in the hole 48" in the cover, and bushings 50" are molded around the assembly in similar manner to FIG. 4. The moisture barrier posed by the web 76 prevents induced moisture from entering the tank for temperature-cycled condensation therein.

The alternative form of secondary entry in FIG. 6 employs a conductive copper or aluminum terminal lug 82 which has a part hollow cylindrical extension 84 thereon that is knurled about the outside surface thereof. In the molding operation, the extension 84 is passed through a hole 48''' in the cover, and an epoxy bushing 86 is cast about the extension to seal up the hole and to retain the extension in the cover, the knurling providing good adhesion between the resin and the metal. The stranded-metal conductive core 87 of secondary cable 88 is then passed through a length of heat shrinkable insulative tubing 90, and inserted in the extension. The extension is then compressed onto the conductive core, to join the cable 88 to the lug 82, and the tubing 90 is shrunk about the entire joint to envelop the protruding portion of the extension 84 and the adjacent end portion of the bushing 86 at one end, and the insulation of the cable 88 at the other end.

Ordinarily, the transformer 2 is fully assembled at the manufacturing plant, and at the time of assembly each of the windings 10 and 12 is electrically connected through the yokes 22 with the cables 26 and 78 (or the terminal lug 82) by means of leads 92. Then the assembled cover 32 and core and coil unit 8 is lowered onto the tank by crane, using the eye 38' of eyebolt 38 to handle the assembly.

The primary cable 26 is grounded through the strands 58 at the time the transformer is installed in the ground. The primary winding is grounded by means of a jumper cable 80 (FIG. 1) which is connected through the primary yoke 22' to the cable conductor 78 (or terminal lug 82) of the house neutral 28'.

What is claimed is:

1. In the manufacture of a hermetically sealed transformer, the steps of forming a reinforced resinous plate cover around a mechanical attachment device so that the cover and device are hermetically sealed to one another and the device provides an attachment point on each side of the cover, forming holes in the cover for a length of primary cable and a pair of moisture proof secondary cable connectors, molding resinous sealing grommets around the holes while the length of cable and connectors are inserted therein, so as to hermetically seal the holes and secure the cable and connectors in the cover, while maintaining exposed electrical contact points for the same on one side of the cover, and freely suspending a transformer core and coil unit from the attachment device on the other side of the cover, for electrical interconnection with the contact points through the cable and connectors, and immersion in a tank of dielectric fluid therebelow.

2. The method according to claim 1 further comprising electrically interconnecting the transformer core and coil unit with the cable and connectors on the aforesaid other side of the cover, before the unit is immersed in the dielectric fluid.

3. The method according to claim 2 further comprising resting the cover on top of the tank, and hermetically sealing it to the same so as to close the tank, after the transformer core and coil unit is immersed in the dielectric fluid.

4. The method according to claim 1 wherein the cover and sealing grommets are formed in separate operations.

5. The method according to claim 1 wherein one end of the primary cable conductor is passed entirely through the cover so that it will project into the tank from the aforesaid other or inside thereof.

6. The method according to claim 5 wherein a stress relief cone is embedded in the sealing grommet around the primary cable.

7. The method according to claim 6 wherein the primary cable conductor has a semiconductive sheath thereon surrounded by a plurality of exposed neutral conductor strands, and the strands are stripped back onto the cable on the aforesaid one side of the cover, and the semiconductive sheath is embedded within the sealing grommet for the primary cable and terminated therewithin at the cone.

8. The method according to claim 1 wherein the secondary contact points are formed by exposing contact surfaces of the connectors.

9. The method according to claim 1 wherein the secondary contact points are formed by interconnecting lengths of secondary cable with the connectors and molding the connections into the cover with the same.

10. In a hermetically sealed transformer of the fluid immersion type, a reinforced resinous plate cover for a tank, said cover having a mechanical attachment device resinously embedded and hermetically sealed therein so as to provide an attachment point on each side of the cover, a length of primary cable and a pair of moisture proof secondary cable connectors resinously embedded and hermetically sealed therein, so as to provide exposed electrical contact points for the same on one side of the cover, and a transformer core and coil unit freely suspended from the attachment device on the other side of the cover, for electrical interconnection with the contact points through the cable and connectors, and immersion in a bath of dielectric fluid in the tank.

11. The transformer according to claim 10 wherein the core and coil unit is electrically interconnected with the cable and connectors on the aforesaid other side of the cover, and immersed in the tank of fluid, and the cover is rested on and bonded to the top of the tank so as to close and hermetically seal the tank with the core and coil unit freely suspended therefrom.

12. The transformer according to claim 10 wherein one end of the primary cable conductor is passed entirely through the cover so that it will project into the tank from the aforesaid other side or inside thereof.

13. The transformer according to claim 12 wherein the primary cable conductor has a semiconductive sheath thereon surrounded by a plurality of exposed neutral conductor strands which are stripped back onto the cable on the aforesaid one side of the cover, and the semiconductive sheath is resinously embedded within the cover and terminated therewithin, there being a stress relief cone embedded in the cover at the terminal end of the sheath.

14. The transformer according to claim 10 wherein the secondary cable connectors are tubular and have solid, electrically conductive moisture barriers formed therein.

15. The transformer according to claim 10 wherein the secondary contact points are formed by exposed contact surfaces of the connectors.

16. The transformer according to claim 10 wherein the secondary contact points are formed by lengths of secondary cable interconnected with the connectors at connections molded into the cover with the connectors.

17. The transformer according to claim 11 wherein the tank has vertically disposed guides angularly spaced about the interior thereof, and the transformer core and coil unit is slidably interengaged with the guides to securely position it therein.

18. The transformer according to claim 11 wherein the tank has an upright elongated tubular configuration, and the core and coil unit is freely suspended in the lowermost portion of the tank, and the dielectric fluid is filled to a level in the uppermost portion of the tank.

References Cited

UNITED STATES PATENTS 2,366,290   1/1945   Rudd _____ 336—92X

ELLIOT GOLDBERG, Primary Examiner

U.S. Cl. X.R.

29—602; 336—192